US008623801B2

(12) United States Patent
Oki et al.

(10) Patent No.: US 8,623,801 B2
(45) Date of Patent: Jan. 7, 2014

(54) ELECTRICALLY CONDUCTIVE POLYETHYLENE RESIN COMPOSITION, ELECTRICALLY CONDUCTIVE POLYETHYLENE RESIN MOLDING SLIDING BEARING, AND SLIDING SHEET

(75) Inventors: Yoshio Oki, Mie (JP); Satoru Fukuzawa, Mie (JP); Daichi Ito, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/998,162

(22) PCT Filed: Sep. 29, 2009

(86) PCT No.: PCT/JP2009/066892
§ 371 (c)(1),
(2), (4) Date: Mar. 22, 2011

(87) PCT Pub. No.: WO2010/038718
PCT Pub. Date: Apr. 8, 2010

(65) Prior Publication Data
US 2011/0170810 A1    Jul. 14, 2011

(30) Foreign Application Priority Data

Sep. 30, 2008  (JP) .................................. 2008-253851
Sep. 25, 2009  (JP) .................................. 2009-220666

(51) Int. Cl.
*C10M 143/02*    (2006.01)
(52) U.S. Cl.
USPC ........................................................ 508/591
(58) Field of Classification Search
USPC ........................................................ 508/591
See application file for complete search history.

(56) References Cited

U.S. PATENT DOCUMENTS 4,737,539 A    4/1988    Jinno
4,877,813 A    10/1989   Jinno

FOREIGN PATENT DOCUMENTS

| CN | 101240092 A | * | 8/2008 |
|---|---|---|---|
| JP | 50-151949 A | | 12/1975 |
| JP | 54-057551 A | | 5/1979 |
| JP | 58-164627 A | | 9/1983 |
| JP | 58164627 A | * | 9/1983 |
| JP | 61-098767 | | 5/1986 |
| JP | 63-033403 | | 2/1988 |

(Continued)

OTHER PUBLICATIONS

PCT Search Report dated Jan. 12, 2010.

(Continued)

*Primary Examiner* — Taiwo Oladapo
(74) *Attorney, Agent, or Firm* — Hedman & Costigan, P.C.; James V. Costigan; Kathleen A. Costigan (57) ABSTRACT

The present invention provides an electrically conductive polyethylene resin composition having a stable volume resistance value and in addition, a low-friction property and a wear-resistant property and a resin molding, a sliding bearing, and a sliding sheet made of the electrically conductive polyethylene resin composition. The electrically conductive polyethylene resin composition contains 100 parts by weight of ultra-high-molecular-weight polyethylene resin which cannot be injection-molded and has a weight average molecular weight of one million to four millions, 2 to 15 parts by weight of Ketjenblack, and 0.5 to 5 parts by weight of at least one powder, having an average particle size of 1 to 30 μm, which is selected from among polytetrafluoroethylene resin powder, graphite powder, and silicone resin powder.

11 Claims, 5 Drawing Sheets

(56) References Cited

FOREIGN PATENT DOCUMENTS

| | | | |
|---|---|---|---|
| JP | 05-320435 A | | 12/1993 |
| JP | 07-94018 A | | 4/1995 |
| JP | 10-251459 A | | 9/1998 |
| JP | 2008-138134 A | | 6/2008 |
| JP | 2008138134 A | * | 6/2008 |
| JP | 2008-163203 A | | 7/2008 |

OTHER PUBLICATIONS

I Mironi-Harpaz, M. Narkis., Thermo-Electric Behaviour (PTC) of Carbon Black Containing PVDF/UHMWPE and PVDF/XL-UHMWPE Blends, Polymer Engineering and Blends, Polymer Engineering and Science, Feb. 2001, vol. 41, No. 2 pp. 205-221.

Zhang Yu-mei et al., UHMWPW/Carbon Black Antistatic Composites, Chemical Industry Press, China; Aug. 31, 2001 pp. 25-28.

* cited by examiner

ELECTRICALLY CONDUCTIVE POLYETHYLENE RESIN COMPOSITION, ELECTRICALLY CONDUCTIVE POLYETHYLENE RESIN MOLDING SLIDING BEARING, AND SLIDING SHEET

RELATED APPLICATION

This application is a national stage entry of PCT/JP2009/066892 filed on Sep. 29, 2009 which claims foreign priority from Japanese Patent Application No. 2009-220666, filed Sep. 25, 2009 and from Japanese Patent Application No. 2008-253851, filed Sep. 30, 2008 which are incorporated by reference in their entirety.

TECHNICAL FIELD

The present invention relates to an electrically conductive polyethylene resin composition and a resin molding, a sliding bearing, and a sliding sheet composed of the electrically conductive polyethylene resin composition.

BACKGROUND ART

Electrically conductive resin compositions are widespread in industry and utilized for various uses and particularly for uses requiring electrical conductivity. As the electrically conductive resin compositions, various compositions each containing resin and a large amount of an electrically conductive filler such as carbon black added thereto are known. Because the electrically conductive resin compositions are economically excellent, they are widely utilized mainly in industry.

In recent years, electrically conductive polymer materials have spread in packaging industry of IC chips, and a variation of the electrically conductive polymer materials is diversified from general-purpose plastics to engineering plastics. It has become increasingly important to take measures for controlling the electrical conductivity of precision equipment and those of peripheral devices disposed on the periphery thereof. As electrically conductive fillers for the electrically conductive polymer materials, in addition to carbon black, carbon fibers, graphite, metal coating fillers, metal fibers, and the like are used widely and properly in dependence on purposes and functions. But the electrically conductive fillers have problems that they deteriorate mechanical properties of the polymer materials and cause moldability to be difficult.

Polyethylene (hereinafter referred to as PE) resin is excellent in its friction and wear properties and mechanical strength and thus widely applied. In addition, an electrically conductive PE resin composition containing the electrically conductive filler has also widely spread. In recent years, with the spread of the precision equipment, a higher electrical conductivity control function is demanded, and thus low friction and wear properties and a stable electrical conductivity are demanded more than ever. A complex composed of the PE resin and the electrically conductive filler represented by carbon black has excellent electrical conductivity and is thus effective for applications requiring electrical conductivity.

For example, an electrically conductive complex composed of ultra-high-molecular-weight polyethylene (hereinafter referred to as UHMWPE) and granular glassy carbon is known (see patent document 1). The electrically conductive complex has a positive characteristic temperature coefficient showing a very large maximum change rate of resistance in a very narrow temperature range.

An electrically conductive thermoplastic resin composition containing 100 parts by weight of PE-based resin having a density of 0.84 to 0.90 g/cm$^3$ and 50 to 1000 parts by weight of a metal filler and/or carbon black is also known (see patent document 2). The electrically conductive thermoplastic resin composition is excellent in molding processability such as in injection molding processability.

An electrically semi-conductive UHMWPE composition, having a specific volume resistivity of $10^5$ to $10^9$ Ω·cm, which contains the UHMWPE having a weight average molecular weight of not less than $5.0 \times 10^5$ and a polydispersity degree in the range of 15 to 100 and Ketjenblack dispersed in the UHMWPE is also known (see patent document 3). At the time of the production of the electrically semi-conductive UHMWPE composition, the UHMWPE and the Ketjenblack are fused and kneaded by using a screw extruder.

PRIOR ART DOCUMENT

Patent Document

Patent document 1: Japanese Patent Application Laid-Open No. 7-94018
Patent document 2: Japanese Patent Application Laid-Open No. 10-251459
Patent document 3: Japanese Patent Application Laid-Open No. 2008-138134

SUMMARY OF THE INVENTION

Problem to be Solved by the Invention

But the electrically conductive complex disclosed in the patent document 1 has the positive characteristic temperature coefficient showing a very large maximum change rate of resistance in the very narrow temperature range of 125 to 140° C. Therefore the electrically conductive complex is used only for a fuse and a planar heating element and is thus unversatile in its use. It is very difficult to use the electrically conductive complex for a sliding bearing.

Because the electrically conductive thermoplastic resin composition disclosed in the patent document 2 contains the metal filler having a specific gravity not less than four times larger than that of the base resin, it is difficult to uniformly mix the base resin and the metal filler with each other. Thus there is a variation in its conductivity. Further the carbon black has a bulk density much smaller than that of the base resin. Therefore when as large as 50 parts by weight of the carbon black is added to 100 parts by weight of the base resin, it is difficult to uniformly mix the base resin and the carbon black with each other. Thus there is a variation in the conductivity of the electrically conductive thermoplastic resin composition.

In the electrically semi-conductive UHMWPE composition disclosed in the patent document 3, the UHMWPE resin (UHMWPE resin which can be injection-molded) which can be fused and kneaded with the electrically conductive filler by using the screw extruder is adopted as the base resin. Such UHMWPE resin has a low-friction property, but has an insufficient wear resistance.

The present invention has been made to cope with the above-described problems. It is an object of the present invention to provide a resin composition having conductivity in a degree not so high or intermediate (for example, volume resistance value: $1.0 \times 10^4$ to $1.0 \times 10^{10}$ Ωcm) and more particularly an electrically conductive PE resin composition having a stable volume resistance value and in addition, a low-friction property and a wear-resistant property and a resin molding, a sliding bearing, and a sliding sheet made of the electrically conductive PE resin composition.

Means for Solving the Problem

The electrically conductive PE resin composition of the present invention is composed of 100 parts by weight of UHMWPE resin which cannot be injection-molded, 2 to 15 parts by weight of electrically conductive carbon, and 0.5 to 5 parts by weight of at least one powder selected from among polytetrafluoroethylene (hereinafter referred to as PTFE) resin powder, graphite powder, and silicone resin powder.

Regarding ingredients of the electrically conductive PE resin composition, the UHMWPE resin which cannot be injection-molded is UHMWPE resin having a weight average molecular weight of one million to four millions. Particles of the UHMWPE resin which cannot be injection-molded are unspherical.

An average particle size of the UHMWPE resin which cannot be injection-molded is not less than three times larger than that of the electrically conductive carbon and that of the powders. The average particle size of the UHMWPE resin which cannot be injection-molded is 100 to 200 μm. The average particle size of the electrically conductive carbon is not more than 1 μm. The average particle size of the powders is 1 to 30 μm. The electrically conductive carbon is Ketjenblack.

The electrically conductive PE resin molding of the present invention is formed by compression-molding the electrically conductive polyethylene resin composition and has a volume resistance value of $1.0 \times 10^4$ to $1.0 \times 10^{10}$ Ωcm. On a surface of the electrically conductive PE resin molding, the electrically conductive carbon and at least one powder selected from among the PTFE resin powder, the graphite powder, and the silicone resin powder are disposed at grain boundaries of the particles of the UHMWPE resin.

The sliding bearing of the present invention is made of the electrically conductive PE resin molding. The sliding bearing is a plain bearing. The plain bearing means a bearing which, inclusive of a sliding surface, is entirely integrally formed with the same material. The sliding bearing is a lamination sliding bearing bonded to a back metal.

The sliding sheet of the present invention is formed by performing a cutting work on the electrically conductive PE resin molding.

Effect of the Invention

The electrically conductive PE resin composition of the present invention contains 100 parts by weight of the UHMWPE which cannot be injection-molded, 2 to 15 parts by weight of the electrically conductive carbon, and 0.5 to 5 parts by weight of at least one powder selected from among the PTFE resin powder, the graphite powder, and the silicone resin powder. Therefore by compression-molding the electrically conductive PE resin composition, a molding having a uniform and stable volume resistance value is obtained.

Because the UHMWPE resin which cannot be injection-molded is UHMWPE resin having a weight average molecular weight of one million to four millions, the molding having a uniform and stable volume resistance value, a low-friction property, and a wear-resistant property is obtained. Because the particles of the UHMWPE resin which cannot be injection-molded are unspherical, the particles of the UHMWPE resin which cannot be injection-molded easily contact each other and are thus easily fused to each other in compression molding. Therefore the molding has a high mechanical strength.

Because the average particle size of the particles of the UHMWPE resin which cannot be injection-molded is not less than three times larger than those of the other ingredients, the particles of the other ingredients easily adhere to those of the UHMWPE resin which cannot be injection-molded. Therefore the ingredients are capable of easily displaying the properties thereof. Because the average particle size of the particles of the UHMWPE resin which cannot be injection-molded is 100 to 200 μm, that of the electrically conductive carbon is not more than 1 μm, and that of the powders is 1 to 30 μm, the ingredients are capable of easily displaying the properties thereof to a higher extent.

The electrically conductive PE resin molding has the volume resistance value of $1.0 \times 10^4$ to $1.0 \times 10^{10}$ Ωcm. On at least the surface of the molding, the electrically conductive carbon and at least one powder selected from among the PTFE resin powder, the graphite powder, and the silicone resin powder are disposed at the grain boundaries of the particles of the UHMWPE resin. Because the molding has the above-described structure, it is possible to preferably use the molding for applications requiring intermediate electrical conductivity. Any of a plain-type sliding bearing obtained by molding the electrically conductive PE resin composition, a lamination-type sliding bearing in which a sheet-shaped sliding sheet obtained by processing the electrically conductive PE resin composition is bonded to a back metal, and a sliding sheet obtained by processing the electrically conductive PE resin composition is excellent in the stability of the volume resistance value, the low-friction property, and the wear-resistant property.

BEST MODE FOR CARRYING OUT THE INVENTION

The base resin of the electrically conductive PE resin composition of the present invention is UHMWPE resin which cannot be injection-molded. The UHMWPE resin is PE resin to be obtained by increasing the molecular weight of PE resin which is crystalline thermoplastic resin obtained by polymerizing ethylene to 500,000 to 7,000,000 from 20,000 to 300,000 which is the normal molecular weight of the PE resin. The UHMWPE resin has unadhesiveness, a low-friction property, and a high insulation property and is easily electrostatically charged. Because the UHMWPE resin has improved wear-resistant property and excellent low-friction property, the UHMWPE resin is used as a material of a sliding bearing. But the UHMWPE resin having a molecular weight more than a million has a very high viscosity when it melts and thus hardly flows. Therefore it is very difficult to mold such UHMWPE resin by a normal injection-molding method. Thus after a material of such UHMWPE is molded by compression molding or RAM extrusion molding, the material is mechanically processed into a desired configuration. The UHMWPE resin which cannot be injection-molded has a lower frictional property than UHMWPE resin which can be injection-molded and is excellent in its wear resistance.

The UHMWPE resin that can be used in the present invention is powder of the UHMWPE resin having a weight average molecular weight of one million to four millions. The UHMWPE resin powders having a commercial name of HI-ZEX MILLION (weight average molecular weight: 500,000 to 6,000,000) and MIPELON (weight average molecular weight: 2,000,000) produced by Mitsui Chemicals, Inc. are exemplified.

It is desirable that particles of the UHMWPE resin which cannot be injection-molded are unspherical. It is desirable that the unspherical particles thereof do not have a particular configuration, but have different configurations. In compression-molding the UHMWPE resin having different configurations, the particles of the UHMWPE resin having different configurations contact each other to a high extent, even though ingredients are added to the UHMWPE resin which cannot be injection-molded and thus the particles easily fuse to each other. Thereby a molding has a high mechanical strength such as its tensile strength and flexural strength and excellent wear resistance.

When the average particle size of the particles of the UHMWPE resin which cannot be injection-molded is not less than three times larger than those of other ingredients, the ingredients are capable of easily penetrating gaps between the particles of the UHMWPE resin, and at the same time the particles of the UHMWPE resin are capable of contacting one another. Thereby the ingredients are capable of easily displaying the properties thereof without deteriorating the mechanical strength and wear resistance of the molding. As specific ranges of the average particle sizes of the ingredients of the electrically conductive PE resin composition, it is preferable that the average particle size of the particles of the UHMWPE resin which cannot be injection-molded is 100 to 200 µm, that the average particle size of electrically conductive carbon is not more than 1 µm, and that the average particle size of particles of powders is 1 to 30 µm, because the electrically conductive carbon and the powders which are the ingredients of the electrically conductive PE resin composition are easily capable of displaying the properties thereof to a higher extent. The average particle sizes are measured by a laser analytical method. As a laser analysis granularity distribution measuring device, it is possible to use Microtrac HRA produced by Leeds and Northrup Co.

Electrical conductivity is imparted to the electrically conductive PE resin composition by adding the electrically conductive carbon to the UHMWPE resin which cannot be injection-molded. As the electrically conductive carbon, it is possible to use any of carbon fibers, carbon nanotubes, fullerene, and carbon powder. Of these electrically conductive carbons, the carbon powder is preferable because it does not have configuration anisotropy and is excellent in its cost performance. Carbon black is known as the carbon powder. It is possible to use the carbon black produced by any of a decomposition method such as a thermal black method and an acetylene black method; and an incomplete combustion method such as a channel black method, a gas furnace black method, an oil furnace black method, a pine smoke method, and a lamp black method. From the standpoint of electrical conductivity, furnace black, acetylene black, and Ketjenblack (registered trademark) are favorably used. Of these carbon blacks, the Ketjenblack is more favorable than the furnace black and the acetylene black because the Ketjenblack is excellent in its conductivity.

It is preferable that the primary particle size of the Ketjenblack is 30 to 38 nm. When the primary particle size thereof is in this range, the electrically conductive PE resin composition is capable of obtaining a sufficient volume resistivity, even though it contains a small amount of the Ketjenblack. The BET specific surface area of the Ketjenblack is preferably 1000 to 1500 $m^2/g$. When the specific surface area thereof is in this range, the stability of the volume resistivity is excellent, even though the electrically conductive PE resin composition contains a small amount of the Ketjenblack. As such Ketjenblack, Ketjenblack EC-600JD produced by Akzo Nobel Polymer Chemicals LLC is exemplified.

The electrically conductive PE resin composition of the present invention contains the UHMWPE resin which cannot be injection-molded and to which the electrically conductive carbon, and at least one powder, selected from among the PTFE resin powder, the graphite powder, and the silicone resin powder are added. These powders serve as a lubricity imparting material for imparting lubricity to the molding to be obtained. By adding these powders to the UHMWPE resin which cannot be injection-molded, the low-friction property of the electrically conductive resin composition is stabilized. In addition, by adding these lubricity imparting materials to the UHMWPE resin which cannot be injection-molded, the electrically conductive carbon easily disperses at the interface of the particles of the UHMWPE resin which cannot be injection-molded, and the stability of the volume resistivity is excellent, even though the addition amount of the carbon is small.

To allow the stabilization of the low-friction property of the electrically conductive PE resin composition of the present invention to be excellent, it is preferable that the average particle size of each of the above-described powders is 1 to 30 µm.

As the PTFE resin powder, powder for molding use and powder for a solid lubricant can be used. The PTFE resin powder modified with alkyl vinyl ether is preferable because such PTFE resin powder enhances the wear resistance of the electrically conductive PE resin composition.

The graphite powder is classified into natural graphite and artificial graphite. The artificial graphite is unsuitable as a lubricant because the lubrication performance thereof is inhibited by carborundum formed while the artificial graphite is being produced and because it is difficult to produce sufficiently graphitized graphite. Because the natural graphite is produced in a perfectly graphitized state, it has a very high lubrication performance and is thus suitable as the solid lubricant. But the natural graphite contains a large amount of impurities which deteriorate its lubrication performance. Thus it is necessary to remove the impurities. But it is difficult to completely remove them.

The graphite powder preferable in the present invention is the artificial graphite containing not less than 98.5 wt % of fixed carbon, because such artificial graphite allows the electrically conductive PE resin composition to easily obtain stable low-friction property.

The silicone resin powder can be preferably used because spherical silicone resin is excellent in the stability of the low-friction property of the electrically conductive PE resin composition. The silicone resin powder of the present invention consists of a methylsilsesquioxane unit and a phenylsilsesquioxane unit or the phenylsilsesquioxane unit. The methylsilsesquioxane unit is shown by $(CH_3)SiO_{3/2}$. The phenylsilsesquioxane unit is shown by $(C_6H_5)SiO_{3/2}$. The silicone resin powder may contain a small amount of $(CH_3)_2(C_6H_5)SiO_{1/2}$, $(CH_3)_3SiO_{1/2}$, $(C_6H_5)_3SiO_{1/2}$, $(CH_3)(C_6H_5)_2SiO_{1/2}$, $(CH_3)_2SiO_{2/2}$, $(C_6H_5)_2SiO_{2/2}$, $(CH_3)(C_6H_5)SiO_{2/2}$, and $SiO_{4/2}$. The spherical silicone resin has a property of preventing the deterioration of the wear resistance of the electrically conductive PE resin composition.

Regarding the mixing ratio of the components of the electrically conductive PE resin composition, 2 to 15 parts by weight of the electrically conductive carbon and 0.5 to 5 parts by weight of at least one powder selected from among the PTFE resin powder, the graphite powder, and the silicone resin powder are added to 100 parts by weight of the UHMWPE resin which cannot be injection-molded.

When the mixing ratio of the electrically conductive carbon is in the range of 2 to 15 parts by weight, the electrically conductive PE resin composition is capable of having the volume resistance value of $1.0 \times 10^4$ to $1.0 \times 10^{10}$ Ωcm. When the mixing ratio of the electrically conductive carbon is less than two parts by weight, the electrically conductive PE resin composition is capable of obtaining the volume resistance value of $1.0 \times 10^{10}$ Ωcm, whereas when the mixing ratio of the electrically conductive carbon exceeds 15 parts by weight, the moldability of the electrically conductive PE resin composition is inferior.

When the mixing ratio of the PTFE resin powder, the graphite powder, and/or the silicone resin powder is less than 0.5 parts by weight, the electrically conductive PE resin composition is incapable of obtaining the low-friction property, and the stability of the low-friction property is inferior. When the mixing ratio of the PTFE resin powder, the graphite powder, and/or the silicone resin powder exceeds 5 parts by weight, the electrically conductive PE resin composition may have inferior wear resistance.

On the surface of the electrically conductive PE resin molding of the present invention, the electrically conductive carbon and the powders serving as the lubricity imparting material are disposed at grain boundaries of the particles of the UHMWPE resin which cannot be injection-molded. The electrically conductive carbon is uniformly dispersed at the grain boundaries owing to the action of the lubricity imparting material. Thereby the electrically conductive PE resin molding is capable of having the volume resistance value of $1.0 \times 10^4$ to $1.0 \times 10^{10}$ Ωcm.

Because the electrically conductive PE resin molding of the present invention has the volume resistance value of $1.0 \times 10^4$ to $1.0 \times 10^{10}$ Ωcm and excellent friction and wear resistance, it is possible to preferably use the electrically conductive PE resin molding for application requiring intermediate electrical conductivity. For example, any of a plain-type sliding bearing obtained by molding the electrically conductive PE resin composition, a lamination-type sliding bearing in which a sheet-shaped sliding sheet obtained by processing the electrically conductive PE resin composition is bonded to a back metal, and a sliding sheet obtained by processing the electrically conductive PE resin composition is excellent in the stability of the volume resistance value thereof, the low-friction property, and the wear-resistant property thereof.

When the electrically conductive PE resin composition is molded into a sheet having a thickness of 0.04 to 1.0 mm, the obtained sheet has an excellent stability in its volume resistance value and in low-friction property and wear-resistant property. Therefore the obtained sheet can be preferably used as various static electricity elimination sheets or electrically conductive sheets.

Various products made of the electrically conductive PE resin composition of the present invention can be produced by carrying out the following producing method: After each of the components including the particles of the UHMWPE resin which cannot be injection-molded, the electrically conductive carbon, the PTFE resin powder, the graphite powder and/or the silicone resin powder is weighed, a homogeneous mixture is prepared. The homogeneous mixture is supplied to a molding die to mold it into a billet which is a material to be molded by compression molding including preforming, calcining, and main molding. The billet is mechanically processed into desired various configurations of products. To process the billet into a sheet, the billet is attached to a lathe and subjected to skiving processing like radish skiving performed to use skived radish as garnishing for raw fish.

It is possible to mold the electrically conductive PE resin composition into a round bar or a tube material by means of ram continuous extrusion molding. These materials are processed into various configurations of products by machining. For example, these materials can be processed into a bush (cylindrical bearing) shown in FIG. 1.

Because various products made of the electrically conductive PE resin composition obtained in this manner have stable conductivity, low-friction property, and excellent wear-resistant property, they can be used as a sliding bearing. Because such products have excellent wear-resistant property for surfaces of mating materials having a high extent of roughness, various products made of the electrically conductive PE resin composition can be used as the sliding bearing applicable outdoors and to environment in which powder is used. The sliding bearing obtained from the electrically conductive PE resin composition of the present invention does not contain a hard material. Thus even though the mating material is a soft material made of synthetic resin, aluminum, alloys thereof, copper, and alloys thereof, the sliding bearing does not wear the mating material.

Figure 1:
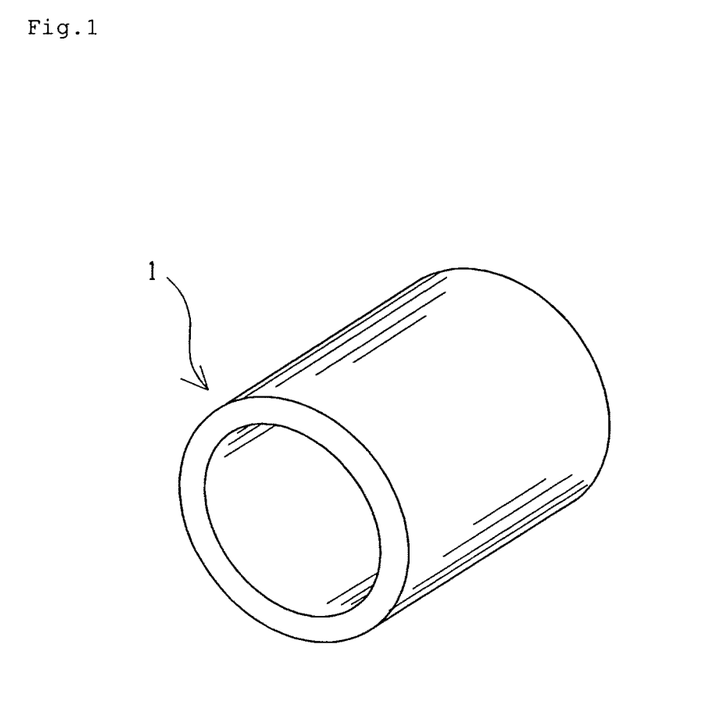
FIG. 1 is a perspective view of a plain-type sliding bearing to be obtained by molding an electrically conductive PE resin composition of the present invention.
Figure 2:
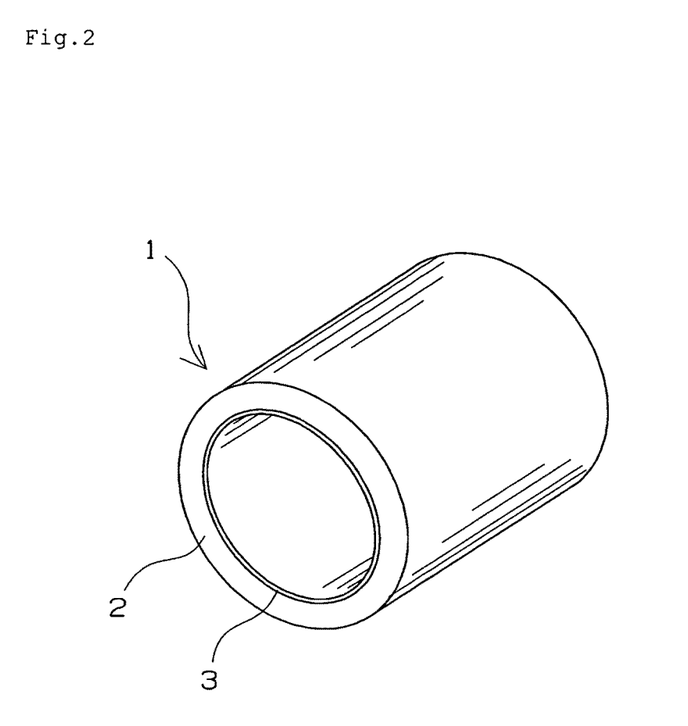
FIG. 2 is a perspective view of a lamination-type sliding bearing composed of a sliding sheet processed into the shape of a sheet from the electrically conductive PE resin composition of the present invention and a back metal to which the sliding sheet is bonded.

Embodiments of the sliding bearing of the present invention are described below with reference to FIGS. 1 and 2. As shown in FIG. 1, the sliding bearing made of the electrically conductive PE resin composition of the present invention can be used as a plain-type sliding bearing 1 cut out of the billet produced by means of the compression molding. As shown in FIG. 2, a sliding sheet 3 processed into the shape of a sheet from the electrically conductive PE resin composition of the present invention can be used as a lamination-type sliding bearing 1 stuck to a back metal 2. The lamination-type sliding bearing, shown in FIG. 2, having the back metal has a merit that the amount of the electrically conductive PE resin composition to be used therefor is smaller than the amount thereof to be used for the plain bearing shown in FIG. 1 and that the lamination-type sliding bearing can be used at a higher surface pressure than the plain bearing.

The sliding bearing obtained by molding the electrically conductive PE resin composition of the present invention can be used as various bearings such as a guide roller for guiding a tape and a rail, a radial bearing and a thrust bearing supporting a supporting shaft, and a grounding button from which it is necessary to eliminate static electricity.

Further, because the sliding bearing obtained by molding the electrically conductive PE resin composition is excellent in its flexibility, it can be used by shaping it in the form of a plate or a sheet with the sliding bearing being flexed. Because the sliding bearing can be used with the sliding bearing being flexed, the sliding bearing is capable of closely contacting a portion from which static electricity is required to be eliminated and reliably eliminating the static electricity.

The sliding sheet made of the electrically conductive PE resin composition of the present invention can be used as various electrically conductive sheets or static electricity elimination sheets such as a thrust washer, an electromagnetic wave shield, a static electricity elimination sheet of a car, an IC package, an electrode lead wire, a grounding material of a pump.

EXAMPLES

Materials used in examples and comparative examples are shown below. Mixing ratios are shown in table 1.
(1) UHMWPE resin which cannot be injection-molded—1: HI-ZEX MILLION 240S produced by Mitsui Chemicals, Inc., weight average molecular weight: two millions, average particle size measured by laser analytical method: 120 μm, particles having different configurations (like baron potato)
(2) UHMWPE resin which cannot be injection-molded—2: HI-ZEX MILLION 240M produced by Mitsui Chemicals, Inc., weight average molecular weight: 2.4 millions, average particle size measured by laser analytical method: 160 μm, particles having different configurations (like baron potato)
(3) Electrically conductive carbon: Ketjenblack EC-600JD produced by Akzo Nobel Polymer Chemicals LLC, primary particle size: 34 nm (average particle size measured by laser analytical method: not more than 0.5 μm), BET specific surface area: 1270 m$^2$/g.
(4) PTFE resin powder: KTL-610 produced by KITAMURA LIMITED, average particle size measured by laser analytical method: 12 μm
(5) Graphite powder: TIMREX KS-25 produced by Timcal Graphite and Carbon Co., Ltd., fixed carbon: 99.9 wt %, average particle size measured by laser analytical method: 25 μm
(6) Silicone resin powder: KMP-590 produced by Shin-Etsu Chemical Co., Ltd., average particle size measured by laser analytical method: 2 μm
(7) UHMWPE resin which can be injection-molded: LUB-MER produced by Mitsui Chemicals, Inc., weight average molecular weight: 250,000 to 600,000.
(8) Polyether ether ketone resin: PEEK-450P produced by Victrex MC Ltd.

Examples 1 through 4 and Comparative Example 1

At the mixing ratios shown in table 1, the materials were dry-blended by using a Henschel dry mixer, and a pressure of 0.5 MPa was applied to a mixture thereof by using a press machine to preform cylindrical, materials to be processed, each of which had an outer diameter of ϕ122 mm, an inner diameter of 64ϕ mm, and a height of 100 mm. Thereafter the materials to be processed were calcined at 370° C. for five hours. The calcined cylindrical materials to be processed were subjected to skiving processing to obtain sheet materials (molding) each having a thickness of 1 mm. Specimens each having a length of 30 mm and a side of 10 mm were cut out of the sheet materials.

Comparative Examples 2 and 3

At the mixing ratios shown in table 1, the materials were dry-blended by using the Henschel dry mixer. Pellets were produced by using a two-axis melt extruder. After the pellets were molded into cylindrical materials, to be processed, which had a diameter of 40 mm and a length of 10 mm by using an injection molding machine, the cylindrical materials to be processed were subjected to a cutting work to prepare specimens each having a thickness of 1 mm, a length of 30 mm, and a side of 10 mm.

Figure 3:
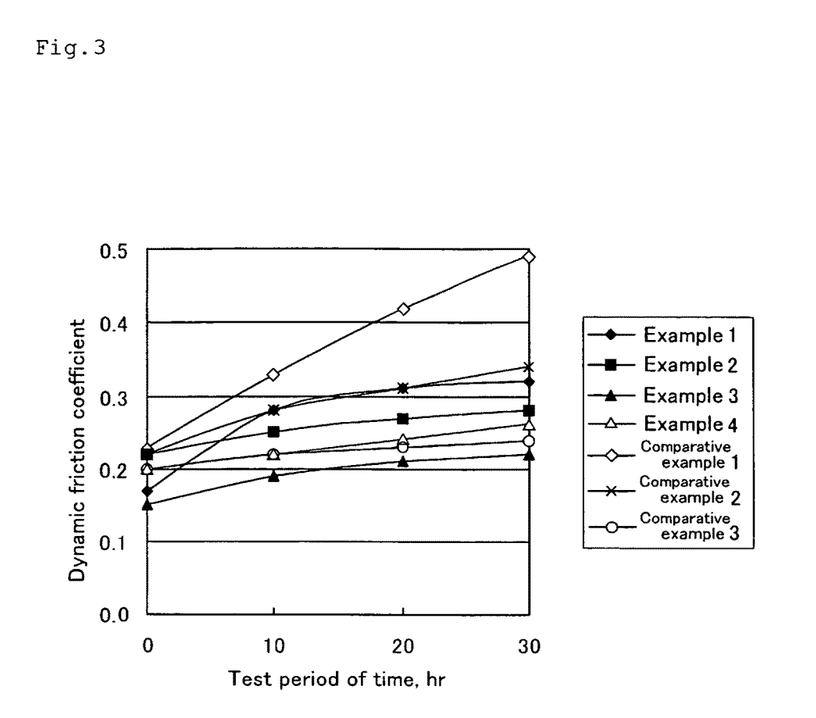
FIG. 3 shows a change of the friction coefficient of the electrically conductive PE resin composition of the present invention with time.
Figure 4:
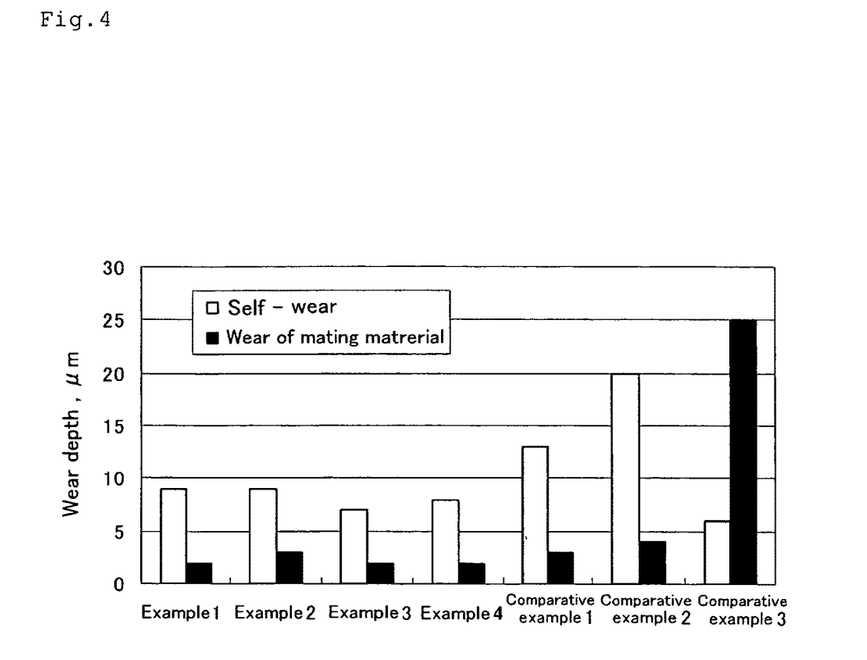
FIG. 4 shows a wear depth of the electrically conductive PE resin composition of the present invention.
Figure 5:
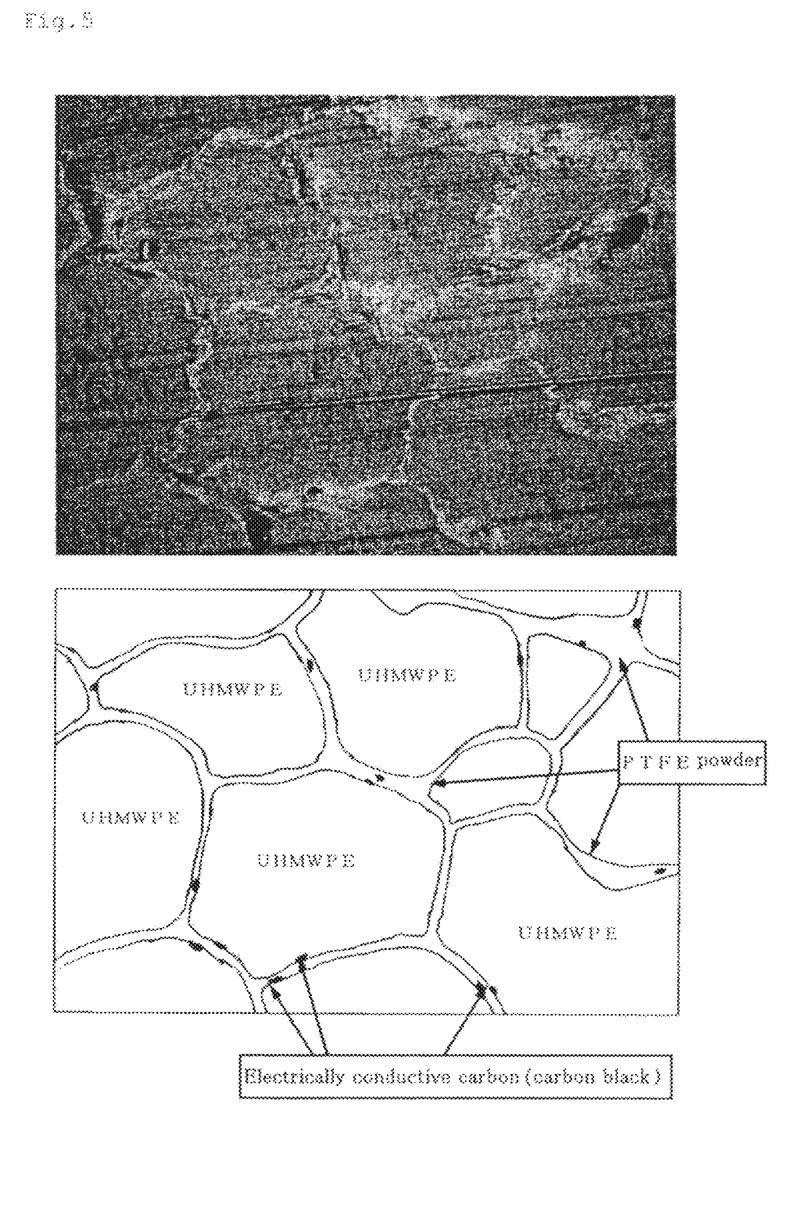
FIG. 5 is an enlarged photograph of the surface of a molding of an example 2 and a schematic view thereof.

By using the specimens, a friction and wear test and a conductivity test were conducted. FIGS. 3 and 4 show the results of the friction and wear test. Table 1 shows the results of the conductivity test. FIG. 5 shows a microphotograph (×500) of the surface of the specimen of the example 2.

In the friction and wear test, a pin-on-disk type testing machine was used. As test conditions, carbon steel S45C was used as a mating material, and with each specimen stuck to the surface of a base material made of rubber (contact surface of specimen with mating material: tip ϕ5 mm×width 10 mm)), each specimen was subjected to the test for 30 hours by setting a sliding speed to 30 m/min, a surface pressure to 0.5 MPa, and a surface temperature of the mating material to 50° C. The dynamic friction coefficient of each specimen was measured every 10 hours, and the wear depth of each specimen immediately after the test finished was measured.

The conductivity test was conducted in accordance with JIS K6371 to measure the volume resistance value (Ωcm) by a voltage and current law.

TABLE 1

| | Example | | | | Comparative example | | |
|---|---|---|---|---|---|---|---|
| Components of resin composition & mixing ratios (part by weight) | 1 | 2 | 3 | 4 | 1 | 2 | 3 |
| UHMWPE resin which cannot be injetion-molded-1 | 100 | 100 | 100 | — | 100 | — | — |
| UHMWPE resin which cannot be injetion-molded-2 | — | — | — | 100 | — | — | — |
| Electrically conductive carbon | 2 | 5 | 15 | 3 | 3 | 5 | 5 |
| PTFE resin powder | 0 | 2 | 0 | 4 | 0 | 2 | 5 |
| Graphite particle | 0.5 | 0 | 0 | 0 | 0 | 0 | 0 |
| Silicone resin powder | 0 | 0 | 5 | 0 | 0 | 0 | 0 |
| UHMWPE resin which can be injection-molded | — | — | — | — | — | 100 | — |
| Polyether ether ketone resin | — | — | — | — | — | — | 100 |
| Volume resistance value, ×10$^5$ Ωcm | 5.3 | 1.9 | 0.5 | 2.3 | 6.4 | 2.0 | 2.3 |

As shown in FIGS. 3 and 4 and table 1, specimens consisting of the moldings of the embodiments composed of the electrically conductive PE resin composition of the present invention had volume resistance values (JIS K6371) in the range of $1.0 \times 10^4$ to $1.0 \times 10^{10}$ Ωcm, low initial friction coefficients, small changes in the friction coefficients in the 30-hour test run, and satisfied the wear resistance. The specimen consisting of the molding of the comparative example 1 which did not contain the lubricity imparting material composing the essential component of the electrically conductive PE resin composition of the present invention had a higher friction coefficient than those of the moldings of the examples with time and was thus unstable in its friction property. The specimens consisting of the moldings of the comparative examples 2 and 3 for which resins different from the base resin of the electrically conductive PE resin composition of the present invention were used and the mating materials had larger wear volumes than those of the examples.

INDUSTRIAL APPLICABILITY

The molding having a uniform and stable volume resistance value, a low-friction property, and a wear-resistant property is obtained from the electrically conductive PE resin composition of the present invention. Therefore the molding can be utilized as various bearings such as a guide roller for guiding a tape and a rail, a radial bearing and a thrust bearing supporting a supporting shaft, and a grounding button from which it is necessary to eliminate static electricity.

EXPLANATION OF REFERENCE SYMBOLS AND NUMERALS

1: sliding bearing
2: back metal
3: sliding sheet

The invention claimed is:

1. A sliding sheet having a thickness of 0.04 to 1.0 mm formed by performing a cutting work on an electrically conductive polyethylene resin molding where said electrically conductive polyethylene resin molding is formed by compression-molding an electrically conductive polyethylene resin composition comprising 100 parts by weight of ultra-high-molecular-weight polyethylene resin which cannot be injection-molded, 2 to 15 parts by weight of electrically conductive carbon, and 0.5 to 5 parts by weight of at least one powder selected from among polytetrafluoroethylene resin powder, graphite powder, and silicone resin powder, said electrically conductive polyethylene resin molding having a volume resistance value of $1.0\times10^4$ to $1.0\times10^{10}$ $\Omega$cm.

2. A sliding sheet having a thickness of 0.04 to 1.0 mm formed by performing a cutting work on an electrically conductive polyethylene resin molding where said electrically conductive polyethylene resin molding is formed by compression-molding an electrically conductive polyethylene resin composition comprising 100 parts by weight of ultra-high-molecular-weight polyethylene resin which cannot be injection-molded, 2 to 15 parts by weight of electrically conductive carbon, and 0.5 to 5 parts by weight of at least one powder selected from among polytetrafluoroethylene resin powder, graphite powder, and silicone resin powder wherein on a surface of said electrically conductive polyethylene resin molding, said electrically conductive carbon and said powders are disposed at grain boundaries of said particles of said ultra-high-molecular-weight polyethylene resin.

3. A sliding sheet having a thickness of 0.04 to 1.0 mm formed by performing a cutting work on an electrically conductive polyethylene resin molding where said electrically conductive polyethylene resin molding is formed by compression-molding an electrically conductive polyethylene resin composition comprising 100 parts by weight of ultra-high-molecular-weight polyethylene resin which cannot be injection-molded, 2 to 15 parts by weight of electrically conductive carbon, and 0.5 to 5 parts by weight of at least one powder selected from among polytetrafluoroethylene resin powder, graphite powder, and silicone resin powder, said electrically conductive polyethylene resin molding having a volume resistance value of $1.0\times10^4$ to $1.0\times10^{10}$ $\Omega$cm, wherein on a surface of said electrically conductive polyethylene resin molding, said electrically conductive carbon and said powders are disposed at grain boundaries of said particles of said ultra-high-molecular-weight polyethylene resin.

4. The sliding sheet according to claim 3, wherein said ultra-high-molecular-weight polyethylene resin which cannot be injection-molded is ultra-high molecular-weight polyethylene resin having weight average molecular weight of one million to four million.

5. The sliding sheet according to claim 3, wherein particles of said ultra-high-molecular-weight polyethylene resin which cannot be injection-molded are unspherical.

6. The sliding sheet according to claim 3, wherein an average particle size of said particles of said ultra-high-molecular-weight polyethylene resin which cannot be injection-molded is not less than three times larger than that of said electrically conductive carbon and that of said powders.

7. The sliding sheet according to claim 3, wherein said average particle size of said particles of said ultra-high-molecular-weight polyethylene resin which cannot be injection-molded is 100 to 200 µm; said average particle size of said electrically conductive carbon is not more than 1 µm; and said average particle size of said powders is 1 to 30 µm.

8. The sliding sheet according to claim 3, wherein said electrically conductive carbon is Ketjenblack.

9. The sliding sheet according to claim 3, wherein said polytetrafluoroethylene resin powder is modified polytetrafluororoethylene resin powder modified with alkyl vinyl ether.

10. The sliding sheet according to claim 3, wherein said graphite particle is artificial graphite containing not less than 98.5 wt % of fixed carbon.

11. The sliding sheet according to claim 3, wherein said silicone resin powder is spherical.

* * * * *